(12) United States Patent
Ranta

(10) Patent No.: US 10,924,449 B2
(45) Date of Patent: Feb. 16, 2021

(54) INTERNET PROTOCOL (IP) ADDRESS ASSIGNMENT

(71) Applicant: Facebook, Inc., Menlo Park, CA (US)

(72) Inventor: Tuomas Juhana Ranta, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 146 days.

(21) Appl. No.: 15/643,371

(22) Filed: Jul. 6, 2017

(65) Prior Publication Data

US 2019/0014078 A1 Jan. 10, 2019

(51) Int. Cl.
| H04L 29/12 | (2006.01) |
| H04L 29/08 | (2006.01) |
| G06Q 30/02 | (2012.01) |
| G06Q 50/00 | (2012.01) |
| H04W 4/80 | (2018.01) |
| H04W 88/12 | (2009.01) |

(52) U.S. Cl.
CPC ......... *H04L 61/20* (2013.01); *G06Q 30/0241* (2013.01); *G06Q 50/01* (2013.01); *H04L 61/2007* (2013.01); *H04L 67/10* (2013.01); *H04L 61/2061* (2013.01); *H04L 61/609* (2013.01); *H04L 61/6068* (2013.01); *H04L 67/16* (2013.01); *H04W 4/80* (2018.02); *H04W 88/12* (2013.01)

(58) Field of Classification Search
None
See application file for complete search history.

(56) References Cited

U.S. PATENT DOCUMENTS 5,898,830 A * 4/1999 Wesinger, Jr. ........ B65B 11/004
726/15
7,136,382 B1 11/2006 Sharma
(Continued)

FOREIGN PATENT DOCUMENTS

DE 102007046561 A1 4/2009
KR 10-1050935 7/2011
(Continued)

OTHER PUBLICATIONS

EESR received from EPO for EP Patent Application No. 18150615.5-1231., dated Jan. 18, 2019.
(Continued)

*Primary Examiner* — Aaron N Strange
*Assistant Examiner* — Mohammad Yousuf A. Mian
(74) *Attorney, Agent, or Firm* — Baker Botts L.L.P.

(57) ABSTRACT

In one embodiment, a method includes partitioning a block of Internet protocol (IP) addresses into one or more sets of IP addresses. The IP addresses of each set of IP addresses are continuously sequential and corresponds to a geographically-distributed Internet point of presence (PoP). Each of the IP addresses in the block corresponds to one of a number of global services. Each PoP supports one or more of the global services. The method also includes assigning a respective one of the sets of IP addresses to each PoP. A prefix of each set of IP addresses is fixed for each set of IP addresses. The method also includes partitioning each set of IP addresses into a number of subsets of IP addresses. One or more of the subsets of IP addresses each corresponds to a respective global service.

20 Claims, 5 Drawing Sheets

(56) References Cited

U.S. PATENT DOCUMENTS

| | | | |
|---|---|---|---|
| 7,328,237 B1 | 2/2008 | Thubert | |
| 2003/0172145 A1* | 9/2003 | Nguyen | G06Q 10/10 709/223 |
| 2004/0109455 A1* | 6/2004 | Jouppi | H04W 28/24 370/395.52 |
| 2009/0043900 A1* | 2/2009 | Barber | H04L 29/12066 709/228 |
| 2009/0113021 A1* | 4/2009 | Andersson | H04L 29/12783 709/218 |
| 2012/0209942 A1* | 8/2012 | Zehavi | H04L 29/08729 709/213 |
| 2013/0246654 A1* | 9/2013 | Cicic | H04L 45/00 709/238 |
| 2014/0029619 A1* | 1/2014 | Patton | H04L 45/7453 370/392 |
| 2014/0215059 A1 | 7/2014 | Astiz Lezaun | |
| 2016/0134489 A1 | 5/2016 | Voltmer | |
| 2017/0126502 A1 | 5/2017 | Horstmann | |
| 2017/0142062 A1 | 5/2017 | Richardson | |
| 2017/0286534 A1* | 10/2017 | Arora | G06F 16/9537 |
| 2018/0091417 A1* | 3/2018 | Ore | H04L 63/0218 |

FOREIGN PATENT DOCUMENTS

| | | |
|---|---|---|
| WO | WO 0054477 A1 | 9/2000 |
| WO | WO 2013034195 A1 | 3/2013 |

OTHER PUBLICATIONS

International Search Report and Written Opinion for International Application PCT/US2017/041126., dated Apr. 4, 2018.

\* cited by examiner

INTERNET PROTOCOL (IP) ADDRESS ASSIGNMENT

TECHNICAL FIELD

This disclosure generally relates to computer networking.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

Particular embodiments may partition a block of Internet protocol (IP) addresses into one or more sets of IP addresses. The sets of Internet protocol (IP) addresses may be assigned to geographically distributed points of presence (PoPs). PoPs are an access point to the Internet and may be configured to deliver Internet-based global services to client systems located within a particular geographic area. Each of the IP addresses in the block may correspond to one of a number of global services, and each PoP may support one or more of the global services. As an example and not by way of limitation, a global service may include messaging, live video streaming, photo sharing, or content delivery. The POPs may be configured to operate using a set of IP addresses from the block of IP addresses and the IP addresses of each set of IP addresses may be continuously sequential. In particular embodiments, a prefix of each set of IP addresses may be fixed for each PoP.

Each set of IP addresses may be mapped into a number of subsets of IP addresses that correspond to a respective global service supported by a respective PoP. In particular embodiments, a suffix of the IP addresses in the subset is fixed across all sets of IP addresses for the respective supported global service. The Internet traffic to the POPs may be classified based on the IP addresses being accessed. A particular global service may be provided as a zero-rated service or be subject to differential pricing. In particular embodiments, the suffix of each subset of IP addresses may correspond to particular tiers of pricing (e.g., standard vs. zero-rated).

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Particular embodiments may define a fixed set of Internet protocol (IP) addresses corresponding to a number of geographically distributed points of presence (PoPs). IP addresses are an identifier assigned to each computer and other device (e.g., printer, router, mobile device, etc.) connected to a communication (e.g., IP) network and are used to locate and identify the node in communications with other nodes on the communication network. A PoP is an access point to the Internet and may be configured to deliver Internet-based global services to client systems located within a particular geographic area. As an example and not by way of limitation, a global service may include messaging, live video streaming, photo sharing, or content delivery. In particular embodiments, a set of Internet protocol (IP) addresses may be assigned to a geographically distributed points of presence (PoPs). A particular set of IP addresses may correspond to a respective one of the PoPs. The IP addresses of each set of IP addresses may be continuously sequential. A prefix of each set of IP addresses may be fixed for each PoP.

Each set of IP addresses may be mapped into a number of subsets of IP addresses that correspond to a respective global service supported by a respective PoP. In particular embodiments, a suffix of the IP addresses in the subset is fixed across all sets of IP addresses for the respective supported global service. The Internet traffic to the POPs may be classified based on the IP addresses being accessed. A particular global service may be provided as a zero-rated service or be subject to differential pricing. In particular embodiments, the suffix of each subset of IP addresses may correspond to particular tiers of pricing (e.g., standard vs. zero-rated).

Figure 1:
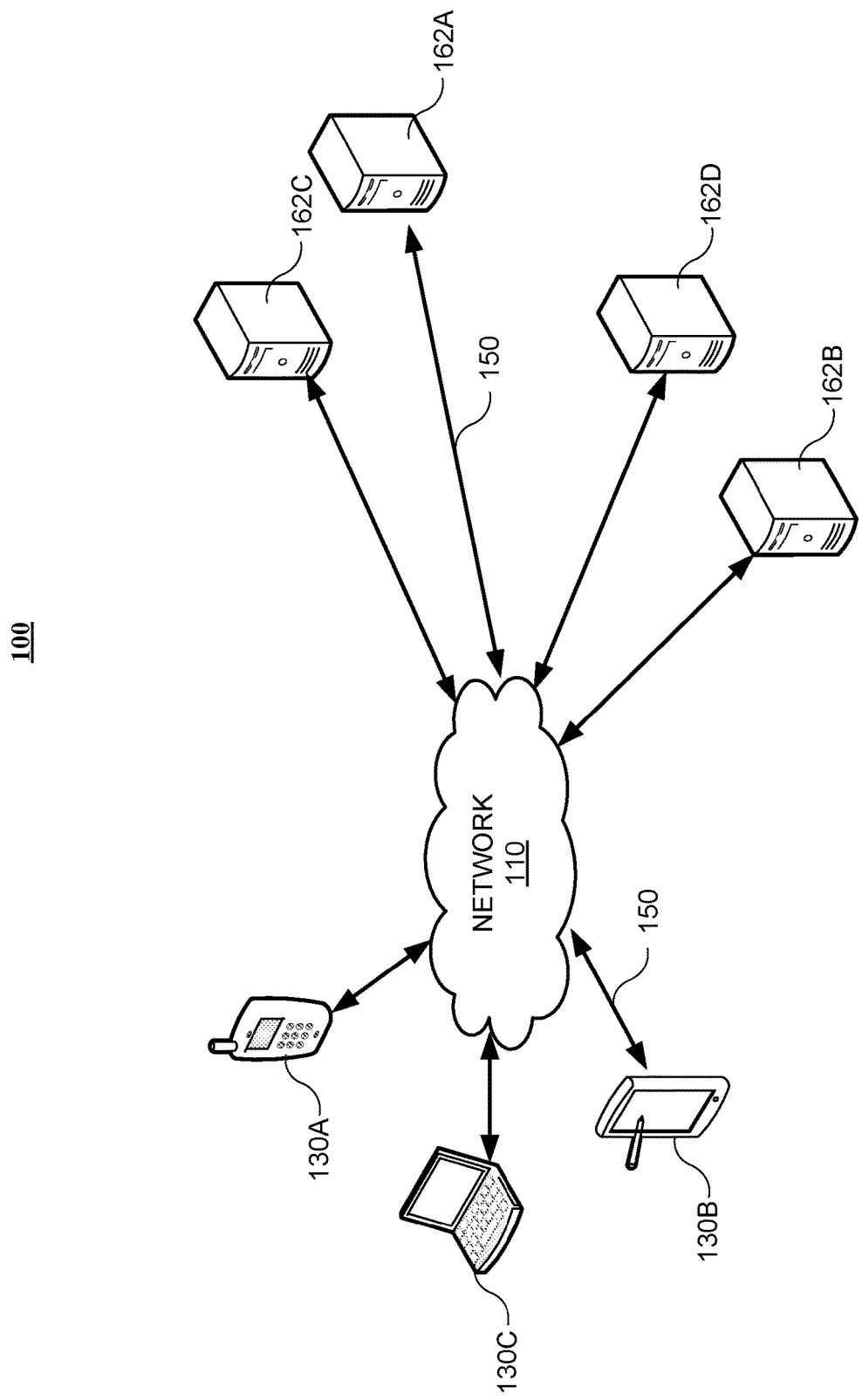
FIG. 1 illustrates an example distributed network environment.

FIG. 1 illustrates an example distributed network environment. In particular embodiments, network environment 100 may include one or more client systems 130A-C and Internet PoPs 162A-D connected to a network 110 through links 150. A PoP is an access point to the Internet. PoPs 162A-D a physical location that may include servers, routers, multiprotocol label switching (MPLS), or Ethernet switches also facilitating digital/analog call aggregators. As an example and not by way of limitation, PoPs 162A-D may be geographically distributed to deliver Internet-based services to client systems 130A-C in multiple geographic locations. As an example, and not by way of limitation, PoPs 162A-B may be geographically distributed within a particular country (e.g., North Carolina and California, respectively) and PoPs 162C-D may be geographically distributed in different countries (e.g., France and Mexico, respectively). Although FIG. 1 illustrates a particular arrangement of client systems, servers, and network, this disclosure contemplates any suitable arrangement of client systems, social-networking system, servers, and network.

Figure 2:
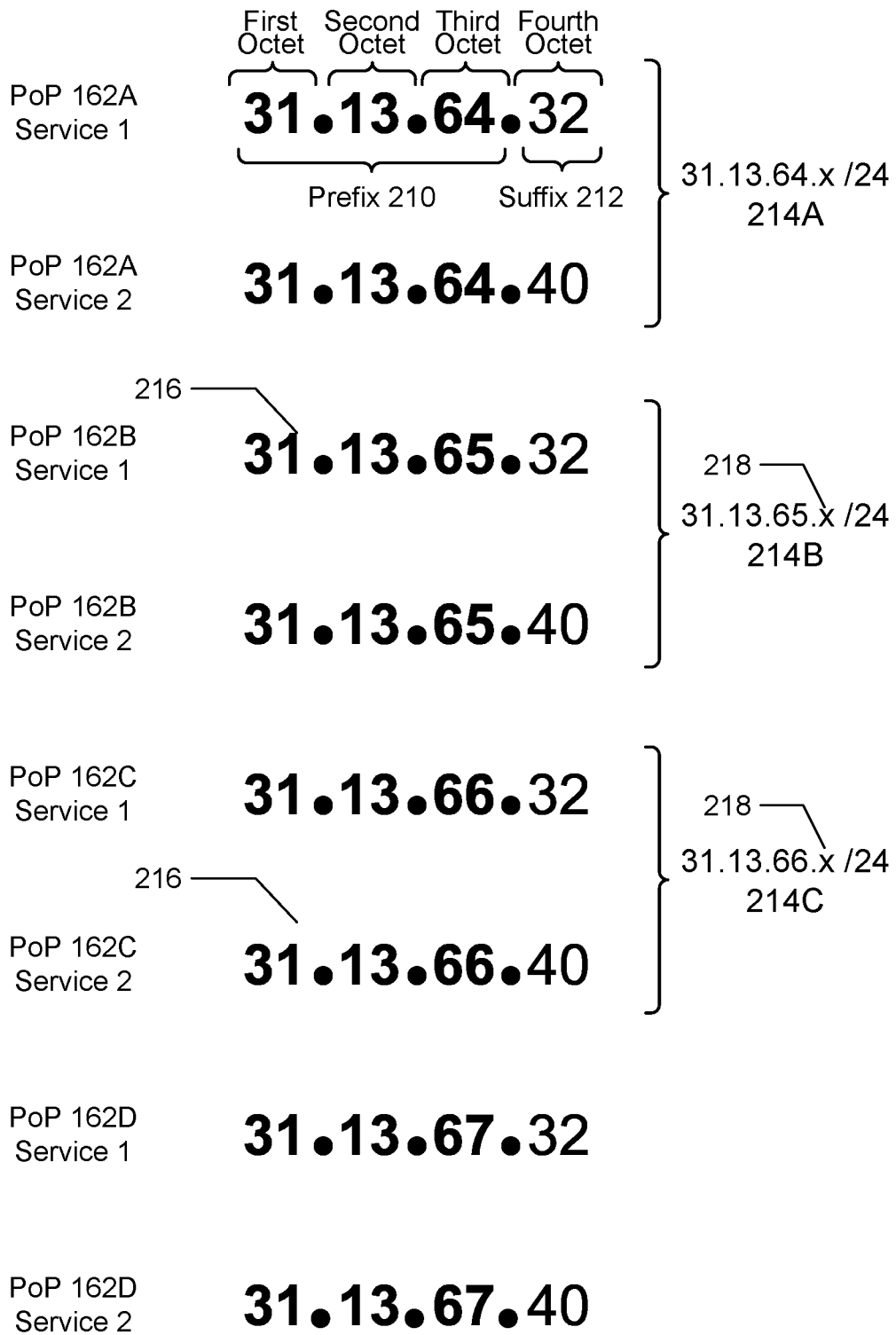
FIG. 2 illustrates an example mapping a global service to a particular subset of IP addresses.

FIG. 2 illustrates an example mapping a global service to a particular subset of IP addresses. As described above, a block of IP addresses may be assigned to geographically distributed PoPs 162A-D. As an example and not by way of limitation, a block of sequentially continuous IP addresses may be assigned (e.g., by the Internet Assigned Numbers Authority (IANA)) to an entity administering PoPs 162A-D. The IP addresses in the block of assigned IP addresses may correspond to one of the global services described above. In particular embodiments, the block of IP addresses may be partitioned into one or more sets of IP addresses 214A-C. Each set of IP addresses 214A-C assigned to a respective geographically-distributed Internet PoP 162A-D and the IP addresses of each set 214A-C may be sequentially continuous. As an example and not by way of limitation, each PoP 162A-D may be assigned a set of IP addresses 214A-C that may include a number of assignable IP addresses for the global services. As described above, a prefix 210 of each set of IP addresses 214A-C may be fixed for each PoP 162A-D. As an example and not by way of limitation, the set of IP addresses 214A assigned to PoP 162A may each have a prefix of 31.13.64, the set of IP addresses 214B assigned to PoP 162B may each have a prefix of 31.13.65, and the set of IP addresses 214C assigned to PoP 162C may each have a prefix of 31.13.66.

For each of set of IP addresses 214A-C (corresponding to the PoPs 162A-D), the global services may be assigned to a particular subset of IP addresses 216. In particular embodiments, the IP addresses of each subset may be sequentially continuous and have suffix range that is fixed across all sets of IP addresses 214A-C corresponding to PoPs 162A-D. As an example and not by way of limitation, messaging services may be assigned to the subset of IP addresses 216 including 31.13.64.32 to 31.13.64.39, another subset 216 including 31.13.65.32 to 31.13.65.39, and a third subset 216 including 31.13.66.32 to 31.13.66.39 for PoPs 162A-C, respectively. As another example, live streaming may be assigned the subset of IP addresses 216 31.13.64.40 to 31.13.64.47, a second subset 216 including 31.13.65.40 to 31.13.65.47, and another subset 216 including 31.13.65.40 to 31.13.65.47 for PoPs 162A-C, respectively. In other words, messaging services may be assigned the subset of IP addresses 216 with the suffix 212 of "32" to "39" and live-streaming services may be assigned to the subset of IP addresses 216 with the suffix 212 of "40" to "47" across all PoPs 162A-D.

As described above, particular subsets of the set of IP addresses 214A-C of each PoP 162A-D may correspond to particular tiers of pricing (e.g., standard vs. zero-rated) or quality of service (QoS). The Internet traffic to POPs 162A-D may be classified based on the IP addresses being accessed. As an example and not by way of limitation, the provider of a communication network (e.g., Internet provider or cellular carrier) may receive a request through a link 150, described below, and compare the destination IP address of the request to a list of destination IP addresses. For example, a cellular carrier may determine whether the request is zero-rated or the request generates charges to the users of client systems 130A-C. If a request received from client systems 130A-C has a destination IP address that is on a list of zero-rated destination IP addresses of PoPs 162A-D, the request may not generate specific data bandwidth charges to the users of client systems 130A-C. If the request received from a particular client system (e.g., 130B) is not on the list of zero-rated destinations, the provider of network may charge the user's account—such as prospectively to a future monthly bill or reducing a balance of available data bandwidth or prepaid amount—for the data bandwidth used in sending the request and, if applicable, receiving a response. As an example and not by way of limitation, messaging services may be a zero-rated service and requests sent to IP address 31.13.64.32 may be classified as a zero-rated service that does not incur any charges to the user of client system 130C sending the request. As another example, live streaming may be classified a premium service and requests sent to IP address 31.13.64.40 may be classified as a premium service and may incur additional charges to the user of client system sending the request (e.g., 130A). Although this disclosure describes sets of IP addresses conforming to a particular version of IP (e.g., IPv4), this disclosure contemplates any suitable communication protocol, such as for example IPv6.

In particular embodiments, an entity administering PoPs 162A-D may provide a list of IP addresses, corresponding to one or more particular pricing tiers (e.g., zero-rated, premium, or standard pricing) or QoS, to a provider of a communication network (e.g., cellular carriers or Internet providers) providing access to the global services of PoPs 162A-D. As an example and not by way of limitation, the list of IP addresses may be a list of IP addresses conforming to version 4 of the Internet Protocol (IPv4). IPv4 IP addresses define an IP address using a 32-bit number that is denoted by 4 octets of bits. The four numbers in an IP address are called octets, corresponding to the eight positions of each octet when written in binary form. The octets may be used to create classes of IP addresses that may be assigned to a particular business, government or other entity based on size and need, as described above.

In particular embodiments, the first 3 octets (prefix 210) of the block of IP addresses may be fixed and the last octet (suffix 212) of the block of IP addresses may be tailored to classify IP traffic. As an example and not by way of limitation, the first 3 octets of the IP addresses of PoP 162A may be denoted by 31.13.64.x/24 or by its binary representation 00001111.00001101.01000000.xxxxxxxx and 31.13.64.0 may be considered the prefix. The notation "/24" may denote the first 24 bits of the prefix are fixed and "x"s may denote a wildcard character 218. For example, a list of IP addresses for PoPs 162A-D may be denoted with the prefix 31.13.64.x/24 corresponding to PoP 162A 31.13.64.x/24, PoP 162B 31.13.65.x/24, and PoP 162C 31.13.66.x/24. As described above, within each of the PoPs 162A-D particular services may be assigned to a particular suffix range across each of the PoPs. For example, zero-rated (e.g., messaging or social-networking) services in PoP 162A may be assigned IP addresses 31.13.64.32 to 31.13.64.39 and PoP 162B 31.13.65.32 to 31.13.65.39. In particular embodiments, the list of zero-rated IP addresses may be expressed as 31.13.64.32/18 #8/5, which is similar to the protocol used above, but with "#8" denoting that 5 bits of the last 8 bits are fixed. As described above, this set of IP addresses may be provided to the Internet providers or cellular carriers using the compact notation.

Figure 3:
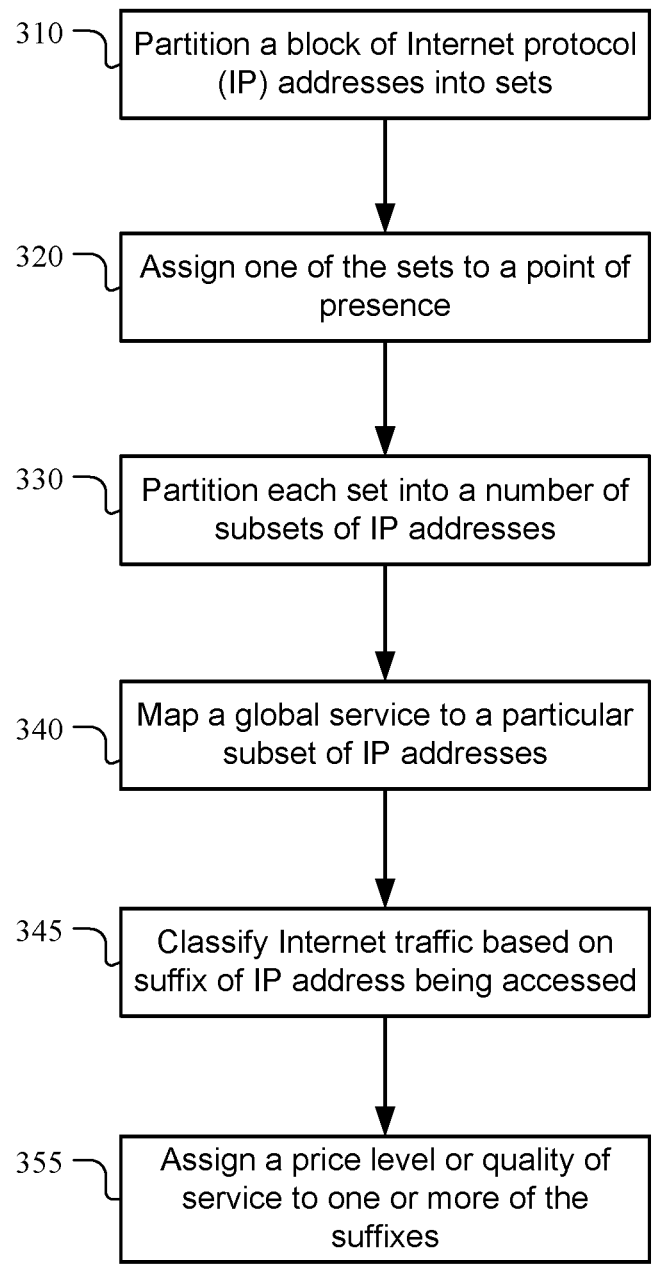
FIG. 3 illustrates an example method for mapping a global service to a particular subset of IP addresses.

FIG. 3 illustrates an example method for mapping a global service to a particular subset of IP addresses. The method 300 may begin at step 310, where a block of Internet protocol (IP) addresses is partitioned into one or more sets of IP addresses. In particular embodiments, the IP addresses of each set of IP addresses are continuously sequential and correspond to a geographically-distributed Internet PoP. Each of the IP addresses in the block may correspond to one of a plurality of global services, and each PoP may support one or more of the global services. At step 320, a respective one of the sets of IP addresses is assigned to each PoP. In particular embodiments, a prefix of each set of IP addresses is fixed for each set of IP addresses. At step 330, each set of IP addresses is partitioned into a number of subsets of IP addresses. In particular embodiments, one or more of the subsets of IP addresses may correspond to a respective global service. At step 340, for each of the sets of IP addresses, one of the global services is mapped to a particular subset of IP addresses. In particular embodiments, a suffix of the mapped subset of IP addresses is fixed across all sets of IP addresses. In particular embodiments, at step 345, for at least one of the PoPs, Internet traffic received at the PoP is classified based at least in part on the suffix of the IP address being accessed. In particular embodiments, at step 355, a price level or quality of service is assigned to one or more of the suffixes. Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for mapping a global service to a particular subset of IP addresses including the particular steps of the method of FIG. 3, this disclosure contemplates any suitable method for mapping a global service to a particular subset of IP addresses including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
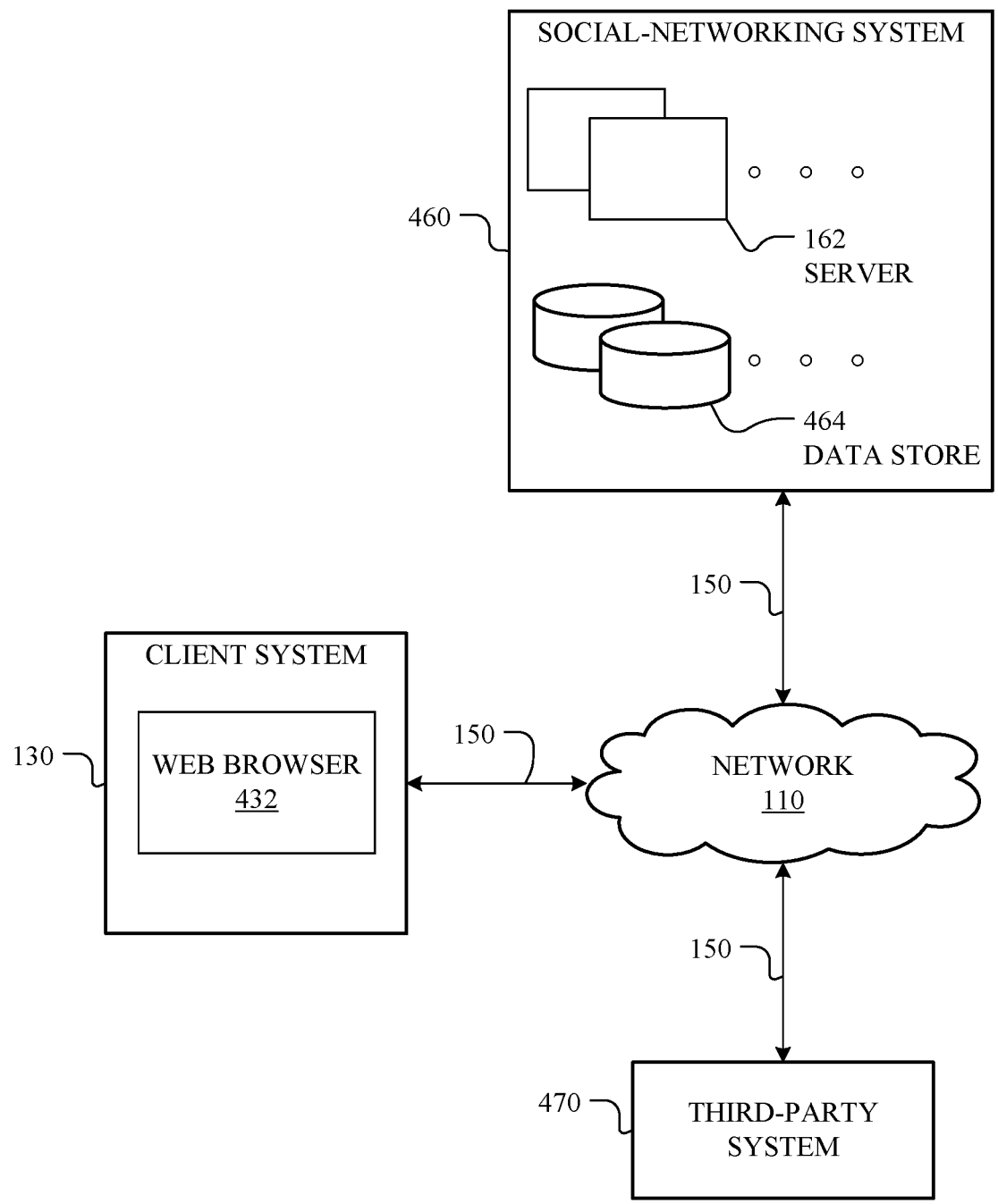
FIG. 4 illustrates an example network environment associated with a social-networking system.

FIG. 4 illustrates an example network environment associated with a social-networking system. Network environment 400 includes a client system 130, a social-networking system 460, and a third-party system 470 connected to each other by a network 410. Although FIG. 4 illustrates a particular arrangement of client system 130, social-networking system 460, third-party system 470, and network 110, this disclosure contemplates any suitable arrangement of client system 130, social-networking system 460, third-party system 470, and network 110. As an example and not by way of limitation, two or more of client system 130, social-networking system 460, and third-party system 470 may be connected to each other directly, bypassing network 410. As another example, two or more of client system 130, social-networking system 460, and third-party system 470 may be physically or logically co-located with each other in whole or in part. Moreover, although FIG. 4 illustrates a particular number of client systems 130, social-networking systems 460, third-party systems 470, and networks 410, this disclosure contemplates any suitable number of client systems 130, social-networking systems 460, third-party systems 470, and networks 110. As an example and not by way of limitation, network environment 300 may include multiple client system 130, social-networking systems 460, third-party systems 470, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 460, and third-party system 470 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 400. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 432, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 432 to a particular server (such as server 162, or a server associated with a third-party system 470), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 460 may be a network-addressable computing system that can host an online social network. Social-networking system 460 may generate, store, receive, and send social-networking data, such as, for example, user-profile data, concept-profile data, social-graph information, or other suitable data related to the online social network. Social-networking system 460 may be accessed by the other components of network environment 400 either directly or via network 110. As an example and not by way of limitation, client system 130 may access social-networking system 460 using a web browser 432, or a native application associated with social-networking system 460 (e.g., a mobile social-networking application, a messaging application, another suitable application, or any combination thereof) either directly or via network 110. In particular embodiments, social-networking system 460 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 460 may include one or more data stores 464. Data stores 464 may be used to store various types of information. In particular embodiments, the information stored in data stores 464 may be organized according to specific data structures. In particular embodiments, each data store 464 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 460, or a third-party system 470 to manage, retrieve, modify, add, or delete, the information stored in data store 464.

In particular embodiments, social-networking system 460 may store one or more social graphs in one or more data stores 464. In particular embodiments, a social graph may include multiple nodes—which may include multiple user nodes (each corresponding to a particular user) or multiple concept nodes (each corresponding to a particular concept)—and multiple edges connecting the nodes. Social-networking system 460 may provide users of the online social network the ability to communicate and interact with other users. In particular embodiments, users may join the online social network via social-networking system 460 and then add connections (e.g., relationships) to a number of other users of social-networking system 460 to whom they want to be connected. Herein, the term "friend" may refer to any other user of social-networking system 460 with whom a user has formed a connection, association, or relationship via social-networking system 460.

In particular embodiments, social-networking system 460 may provide users with the ability to take actions on various types of items or objects, supported by social-networking system 460. As an example and not by way of limitation, the items and objects may include groups or social networks to which users of social-networking system 460 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 460 or by an external system of third-party system 470, which is separate from social-networking system 460 and coupled to social-networking system 460 via a network 110.

In particular embodiments, social-networking system 460 may be capable of linking a variety of entities. As an example and not by way of limitation, social-networking system 460 may enable users to interact with each other as well as receive content from third-party systems 470 or other entities, or to allow users to interact with these entities through an application programming interfaces (API) or other communication channels.

In particular embodiments, a third-party system 470 may include one or more types of servers, one or more data stores, one or more interfaces, including but not limited to APIs, one or more web services, one or more content sources, one or more networks, or any other suitable components, e.g., that servers may communicate with. A third-party system 470 may be operated by a different entity from an entity operating social-networking system 460. In particular embodiments, however, social-networking system 460 and third-party systems 470 may operate in conjunction with each other to provide social-networking services to users of social-networking system 460 or third-party systems 470. In this sense, social-networking system 460 may provide a platform, or backbone, which other systems, such as third-party systems 470, may use to provide social-networking services and functionality to users across the Internet.

In particular embodiments, a third-party system 470 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 460 also includes user-generated content objects, which may enhance a user's interactions with social-networking system 460. User-generated content may include anything a user can add, upload, send, or "post" to social-networking system 460. As an example and not by way of limitation, a user communicates posts to social-networking system 460 from a client system 130. Posts may include data such as status updates or other textual data, location information, photos, videos, links, music or other similar data or media. Content may also be added to social-networking system 460 by a third-party through a "communication channel," such as a newsfeed or stream.

In particular embodiments, social-networking system 460 may include a variety of servers, sub-systems, programs, modules, logs, and data stores. In particular embodiments, social-networking system 460 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 460 may also include suitable components such as network interfaces, security mechanisms, load balancers, failover servers, management-and-network-operations consoles, other suitable components, or any suitable combination thereof. In particular embodiments, social-networking system 460 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 460 to one or more client systems 130 or one or more third-party system 470 via network 410. The web server may include a mail server or other messaging functionality for receiving and routing messages between social-networking system 460 and one or more client systems 130. An API-request server may allow a third-party system 470 to access information from social-networking system 460 by calling one or more APIs. An action logger may be used to receive communications from a web server about a user's actions on or off social-networking system 460. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 460. A privacy setting of a user determines how particular information associated with a user can be shared. The authorization server may allow users to opt in to or opt out of having their actions logged by social-networking system 460 or shared with other systems (e.g., third-party system 470), such as, for example, by setting appropriate privacy settings. Third-party-content-object stores may be used to store content objects received from third parties, such as a third-party system 470. Location stores may be used for storing location information received from client systems 130 associated with users. Advertisement-pricing modules may combine social information, the current time, location information, or other suitable information to provide relevant advertisements, in the form of notifications, to a user.

In particular embodiments, an advertisement may be text (which may be HTML-linked), one or more images (which may be HTML-linked), one or more videos, audio, other suitable digital object files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 460). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 460 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 460) or RSVP (e.g., through social-networking system 460) to an event associated with the advertisement. In addition or as an alternative, an advertisement may include social-networking-system content directed to the user. As an example and not by way of limitation, an advertisement may display information about a friend of the user within social-networking system 460 who has taken an action associated with the subject matter of the advertisement.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node corresponding to a particular photo may have a privacy setting specifying that the photo may only be accessed by users tagged in the photo and their friends. In particular embodiments, privacy settings may allow users to opt in or opt out of having their actions logged by social-networking system 460 or shared with other systems (e.g., third-party system 470). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 470, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 462 may be authorization/privacy servers for enforcing privacy settings. In response to a request from a user (or other entity) for a particular object stored in a data store 464, social-networking system 460 may send a request to the data store 464 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 464, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 5:
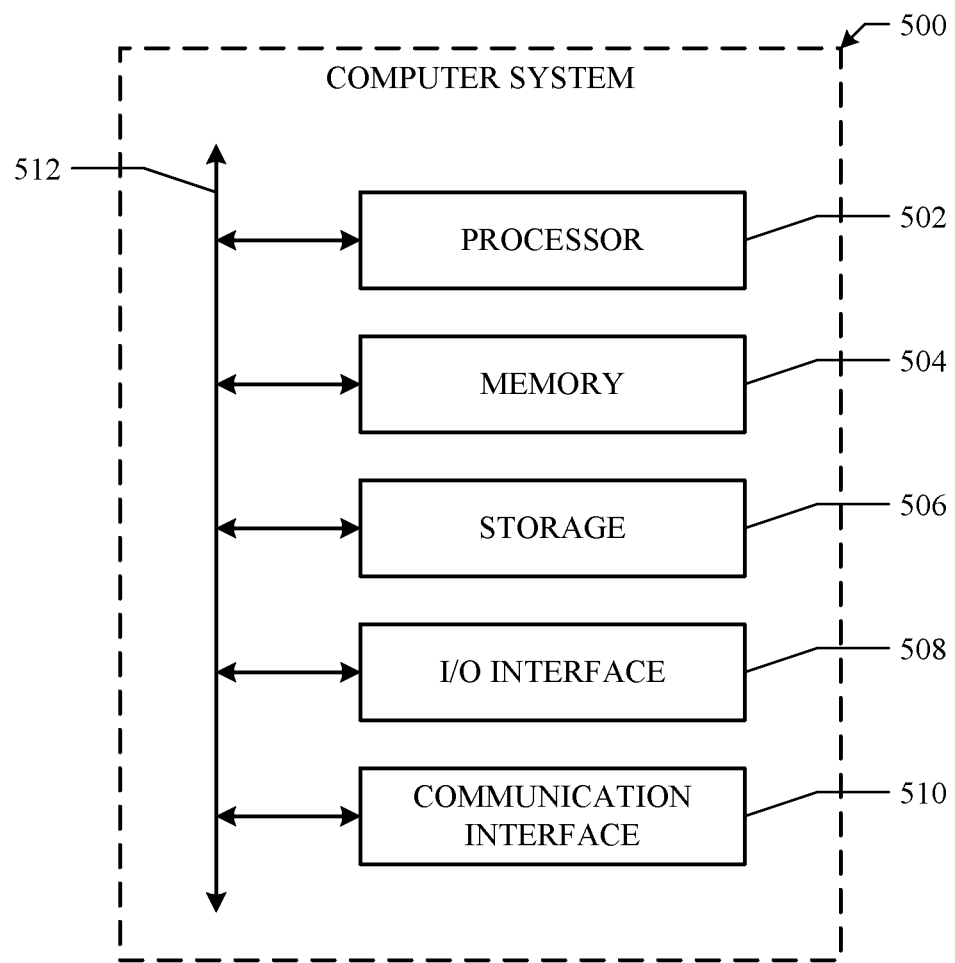
FIG. 5 illustrates an example computer system.

FIG. 5 illustrates an example computer system. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   by a computing device, partitioning a block of Internet protocol (IP) addresses into one or more sets of continuously sequential IP addresses, wherein each set of IP addresses corresponds to a particular one of a plurality of geographically-distributed Internet points of presence (PoPs), wherein each of the IP addresses in the block corresponds to one of a plurality of global services, and wherein each of the plurality of PoPs delivers one or more of the global services from one of a plurality of geographic locations of the PoP;

by the computing device, assigning a respective one of the sets of continuously sequential IP addresses to each PoP, wherein a prefix of each set of continuously sequential IP addresses comprises a first portion that is fixed for all of the plurality of PoPs and a second portion that is unique for a particular PoP;

by the computing device, partitioning each set of IP addresses of each of the plurality of PoPs into a plurality of subsets of continuously sequential IP addresses, wherein one or more of the subsets of continuously sequential IP addresses each corresponds to a respective global service;

by the computing device, mapping a particular global service associated with two or more PoPs located at different geographic locations to a suffix range of continuously sequential IP addresses of the one or more of the subsets, wherein the suffix range of the continuously sequential IP addresses mapped to the particular global service is fixed across the two or more PoPs located at different geographic locations; and by the computing device, assigning a price level to the suffix range of the continuously sequential IP addresses based on the mapped particular global service.

2. The method of claim 1, wherein:
the prefix corresponds to a first 3 octets of each of the continuously sequential IP addresses;
the suffix range corresponds to a range of last octets of the continuously sequential IP addresses; and
each octet represents 8 bits of the continuously sequential IP address.

3. The method of claim 1, further comprising, for at least one of the PoPs, classifying Internet traffic received at the PoP based at least in part on the suffix range of the continuously sequential IP addresses being accessed.

4. The method of claim 3, wherein classifying Internet traffic comprises matching the suffix range of the continuously sequential IP addresses being accessed to a suffix range corresponding to one or more of the global services.

5. The method of claim 1, wherein the plurality of global services comprises messaging, live video, or photo sharing.

6. The method of claim 1, wherein at least one bit of at least one continuous sequential IP address is specified using a wildcard character.

7. The method of claim 1, wherein the set of continuous sequential IP addresses conforms to an Internet protocol version 8 format.

8. One or more computer-readable non-transitory storage media embodying software that is operable when executed to:
partition a block of Internet protocol (IP) addresses into one or more sets of continuously sequential IP addresses, wherein each set of IP addresses corresponds to a particular one of a plurality of geographically-distributed Internet points of presence (PoPs), wherein each of the IP addresses in the block corresponds to one of a plurality of global services, and wherein each of the plurality of PoPs delivers one or more of the global services from one of a plurality of geographic locations of the PoP;
assign a respective one of the sets of continuously sequential IP addresses to each PoP, wherein a prefix of each set of continuously sequential IP addresses comprises a first portion that is fixed for all of the plurality of PoPs and a second portion that is unique for a particular PoP;
partition each set of IP addresses of each of the plurality of PoPs into a plurality of subsets of continuously sequential IP addresses, wherein one or more of the subsets of continuously sequential IP addresses each corresponds to a respective global service;
map a particular global service associated with two or more PoPs located at different geographic locations to a suffix range of continuously sequential IP addresses of the one or more of the subsets, wherein the suffix range of the continuously sequential IP addresses mapped to the particular global service is fixed across the two or more PoPs located at different geographic locations; and
assign a price level to the suffix range of the continuously sequential IP addresses based on the mapped particular global service.

9. The media of claim 8, wherein:
the prefix corresponds to a first 3 octets of each of the continuously sequential IP addresses;
the suffix range corresponds to a range of last octets of the continuously sequential IP addresses; and
each octet represents 8 bits of the continuously sequential IP address.

10. The media of claim 8, wherein the software is further operable to, for at least one of the PoPs, classify Internet traffic received at the PoP based at least in part on the suffix range of the continuously sequential IP addresses being accessed.

11. The media of claim 10, wherein the software is further operable to match the suffix range of the continuously sequential IP addresses being accessed to a suffix range corresponding to one or more of the global services.

12. The media of claim 8, wherein the plurality of global services comprises messaging, live video, or photo sharing.

13. The media of claim 8, wherein at least one bit of at least one continuous sequential IP address is specified using a wildcard character.

14. The media of claim 8, wherein the set of continuous sequential IP addresses conforms to an Internet protocol version 4 format.

15. A system comprising:
one or more processors; and
a memory coupled to the processors comprising instructions executable by the processors, the processors being operable when executing the instructions to:
partition a block of Internet protocol (IP) addresses into one or more sets of continuously sequential IP addresses, wherein each set of IP addresses corresponds to a particular one of a plurality of geographically-distributed Internet points of presence (PoPs), wherein each of the IP addresses in the block corresponds to one of a plurality of global services, and wherein each of the plurality of PoPs delivers one or more of the global services from one of a plurality of geographic locations of the PoP;
assign a respective one of the sets of continuously sequential IP addresses to each PoP, wherein a prefix of each set of continuously sequential IP addresses comprises a first portion that is fixed for all of the plurality of PoPs and a second portion that is unique for a particular PoP;
partition each set of IP addresses of each of the plurality of PoPs into a plurality of subsets of continuously sequential IP addresses, wherein one or more of the subsets of continuously sequential IP addresses each corresponds to a respective global service; and map a particular global service associated with two or more PoPs located at different geographic locations to a suffix range of continuously sequential IP addresses of the one or more of the subsets, wherein the suffix range of the continuously sequential IP addresses mapped to the particular global service is fixed across the two or more PoPs located at different geographic locations; and assign a price level to the suffix range of the continuously sequential IP addresses based on the mapped particular global service.

16. The system of claim 15, wherein:

the prefix corresponds to a first 3 octets of each of the continuous sequential IP addresses;

the suffix range corresponds to a range of last octets of the continuously sequential IP addresses; and each octet represents 8 bits of the continuously sequential IP address.

17. The system of claim 15, wherein the processors are further operable to, for at least one of the PoPs, classify Internet traffic received at the PoP based at least in part on the suffix range of the continuously sequential IP addresses being accessed.

18. The system of claim 17, wherein the processors are further operable to match the suffix range of the continuously sequential IP addresses being accessed to a suffix range corresponding to one or more of the global services.

19. The method of claim 1, wherein the price level assigned to the suffix range of the continuously sequential IP addresses is used by a provider of a communication network for charging users sending requests to destination IP addresses that falls within the suffix range of the continuously sequential IP addresses.

20. The media of claim 8, wherein the price level assigned to the suffix range of the continuously sequential IP addresses is used by a provider of a communication network for charging users sending requests to destination IP addresses that falls within the suffix range of the continuously sequential IP addresses.

* * * * *